March 6, 1962 C. M. CAMPBELL, JR 3,023,965

SEMI-CONDUCTOR ADDER

Filed Feb. 27, 1959 2 Sheets-Sheet 1

INVENTOR.
CARL M. CAMPBELL, JR.

BY John R. Manning

AGENT

March 6, 1962 C. M. CAMPBELL, JR 3,023,965

SEMI-CONDUCTOR ADDER

Filed Feb. 27, 1959

2 Sheets-Sheet 2

INVENTOR.
CARL M. CAMPBELL, JR.
BY John R. Manning
AGENT

United States Patent Office 3,023,965
Patented Mar. 6, 1962

3,023,965
SEMI-CONDUCTOR ADDER

Carl M. Campbell, Jr., Broomall, Pa., assignor to Burroughs Corporation, Detroit, Mich., a corporation of Michigan Filed Feb. 27, 1959, Ser. No. 795,933
3 Claims. (Cl. 235—176)

This invention relates generally to adding circuits and more specifically to a coincidence type adding circuit utilizing a transistor.

The invention finds use in computing systems wherein binary number are added. In order to perform an addition of two numbers in any radix system, an addend digit, an augend digit, and a previous carry digit must be summed. It has been found that these three digits may be added as pairs in two separate steps or simultaneously in one step. The term half-adder has been used to denote a system or device in which two digits are added. A half-adder delivers a sum and carry digit for each pair of digits which it receives. A device which employs two half-adders to perform an addition of three digits in two separate steps is termed a full adder. These coincidence type adding circuits may employ logical "and," "or," and "inhibit" circuits arranged in a predetermined logical manner to produce the type of adding circuit desired.

Prior art adding circuits employed either vacuum tubes or a multiplicity of diodes, transistors, capacitors, resistors and inductors. The circuits were critical in operation and not economical in their construction.

It is, therefore, a general object of the invention to improve adding circuits.

It is another important object of the invention to improve coincidence type adding circuits employing a semi-conductor.

It is a further object of the invention to reduce the number of circuit elements required in adding circuits.

It is a still further object of the invention to increase the stability and reliability of semi-conductor adding circuits.

The invention described herein will perform the logical function of adding binary numbers utilizing a minimum of components. The improved circuit has the additional advantage that only one positive and one negative voltage source, in addition to input sources, are required for its proper operation.

In general, when the sum of two digits in corresponding orders of two numbers to be added is equal to or is greater than the radix of the system in use, the sum digit of the next higher order must be increased by one. The rules for the binary addition of digits are expressed by the use of the following table, where the augend digit is the digit to which the addend digit is being added:

| | | | | |
|---|---|---|---|---|
| Augend digit | 0 | 1 | 0 | 1 |
| Addend digit | 0 | 0 | 1 | 1 |
| Sum digit | 0 | 1 | 1 | 0 |
| Carry | 0 | 0 | 0 | 1 |

The invention will accept two signals representing the augend and addend digits and produce output signals representing the sum and carry in accordance with the above table. This device is known as a half-adder. The reason that the "half" is employed is that it is yet necessary to add the carry signal from the next lower order so as to obtain the correct sum digit in the number representing the sum of the augend and addend.

From the above table it may be deduced that the Boolean algebra expressions for simple binary addition by a half-adder are:

$$\text{Sum}=X\overline{Y}+\overline{X}Y$$
$$\text{Carry}=XY$$

X and Y are the input signals of a given order in the augend and addend and the above expressions may be read as "the sum equals X and not Y "or" not X and Y; the carry equals X "and" Y."

In general the adding is accomplished by an interconnected "and" gate, an "or" gate and an "inhibit" circuit.

Further objects and meritorious features of the invention will be found throughout the following more detailed description of the invention, particularly when considered with the accompanying drawings in which.

Figure 1:
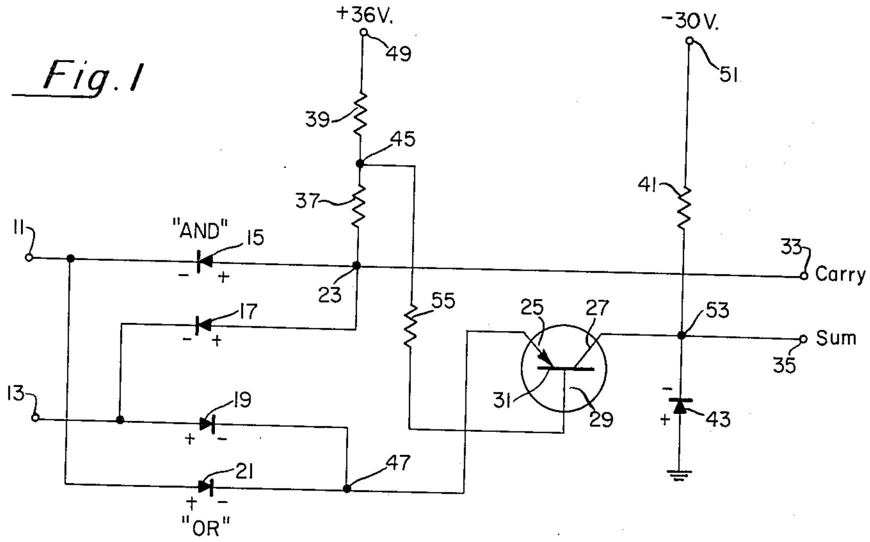
FIGURE 1 is a circuit diagram of a half-adder constructed in accordance with the invention.

Referring now to FIGURE 1 of the schematic diagram, a half-adder circuit constructed in accordance with the invention will be described. The inputs 11 and 13 are coupled to the diodes 15, 17, 19 and 21 which constitute an "and" gate and an "or" gate. The outputs of the diodes 15 and 17 which constitute the "and" gate are coupled to a common point 23 and to the "carry" digit output terminal 33. Also connected to the common point 23 is a positive voltage source through the resistors 37 and 39. The point common to the resistors 37 and 39 is coupled to the base 29 of the PNP transistor 31 through the resistor 55.

The outputs of the diodes 19 and 21 which constitute the "or" gate are coupled to the emitter 25 of the transistor 31.

The collector 27 of the transistor 31 is coupled to the "sum" digit output terminal 35, a grounded clamping diode 43, and a source of negative potential through the resistor 41.

The operation of the circuit will now be explained. During the quiescent state, the input terminals 11 and 13 will be at ground potential and no output appears at either the "sum" terminal 35 or the "carry" terminal 33. Due to the voltage divider action of the resistors 39 and 37 and the positive voltage applied to the terminal 49, the point 45 is more positive than ground, while the point 47 can not be more positive than ground. Therefore, the transistor 31 is biased off. Due to the diode 43, the point 53 is clamped at ground potential. Initially, during the quiescent state a small current flows through the resistor 39, the resistor 37 and the parallel diodes 15 and 17 to the input terminals 11 and 13 which are, as previously stated, at ground potential.

For the purposes of explanation of the operation of the invention, the input voltages, the voltages applied to the input terminals 11 and/or 13, will be +6 volts. An input of +6 volts at either of the input terminals 11 or 13 but not at both terminals, does not affect point 23, which remains at more than ground potential due to the diodes 15 and 17. The point 45 remains more positive than ground potential as well as the base 29 of the transistor 31 and the point 47 rises to +6 volts because of the "or" gate effect of the diodes 19 and 21. With the input voltage of +6 volts appearing at the point 47 and consequently on the emitter 25 of the transistor 31, the emitter 25 is positive with respect to the base 29. The transistor 31 saturates and the point 53, from the collector 27, will go to approximately +6 volts due to this positive voltage which back biases the diode 43. Because of the direct connection from the point 53 to the "sum" terminal 35, the +6 volts will appear as an output at the "sum" terminal 35. The base 29 of the transistor 31 will be at nearly +6 volts, since the transistor 31 is saturated.

If both the input terminals 11 and 13 are raised to +6 volts, the "carry" output 33 will go to +6 volts due to the "and" gate effect of the diodes 15 and 17. As stated previously in the quiescent state the input terminals 11 and 13 are at ground potential and when input pulses of +6 volts are applied to these terminals simultaneously, the small quiescent current flow through the resistors 39 and 37 and the diodes 15 and 17 of the "and" gate is altered and the +6 volts will appear at the point 23 and, consequently, due to the direct connection from the point 23 to the "carry" output terminal 33, +6 volts will appear at the "carry" output terminal 33. The point 45 will assume a value somewhat more positive than the +6 volts due to the voltage divider action of the resistors 37 and 39 and the point 47 will be at +6 volts due to the passage of the pulse through the diodes 19 and 21. As a result, the transistor 31 will remain off, causing the point 53 to remain at ground potential. To state it another way, the transistor will be biased off when simultaneous inputs are applied to the input terminals 11 and 13 since the point 45, which is connected to the base 29 of the transistor 31, assumes a value which is positive with respect to the emitter 25.

The resistor 55 is employed in order to limit the base current of the transistor 31 to a safe value. It is understood that an input of +6 volts may not produce an output of exactly the same value due to the internal resistance of the components. The input may be a sine wave, a square wave, a peaked wave, or may be of other configuration.

Figure 2:
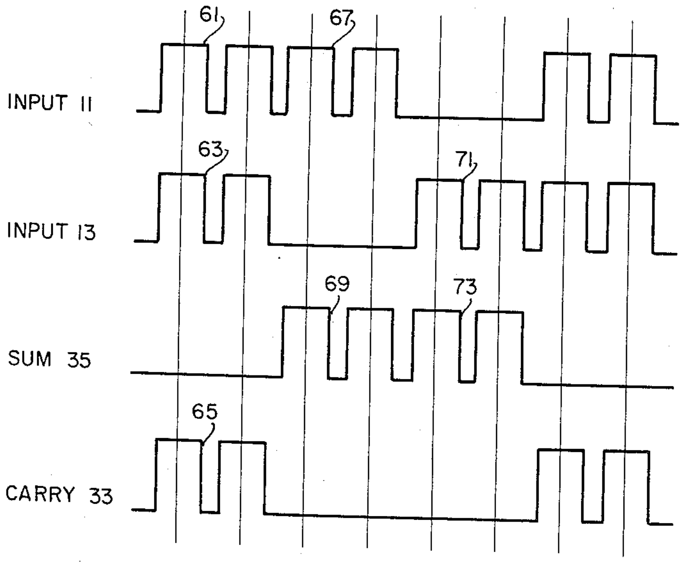
FIGURE 2 is a graph of typical wave forms employed throughout the invention.

In FIGURE 2, examples of wave forms as used in the invention are shown. If an input is available simultaneously at the inputs 11 and 13, as shown by the wave forms 61 and 63, an output is derived only at the carry terminal 33 as shown by the wave form 65. If an input is applied at the input terminal 11 only, as shown by the wave form 67, an output is derived at the sum terminal 35 only as shown by the wave form 69. If an input is applied to the input terminal 13 only, as shown by the wave form 71, an output is derived at the sum terminal 35 only, shown as the wave form 73.

Figure 3:
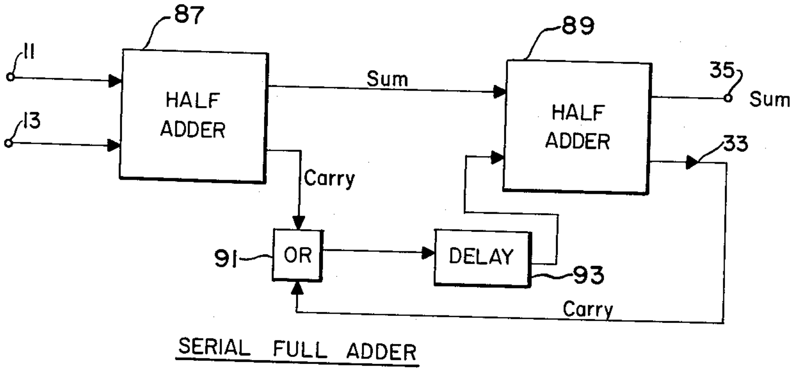
FIGURE 3 is a block diagram of a pair of half-adders employed in a full adder for use in a serial machine.
Figure 4:
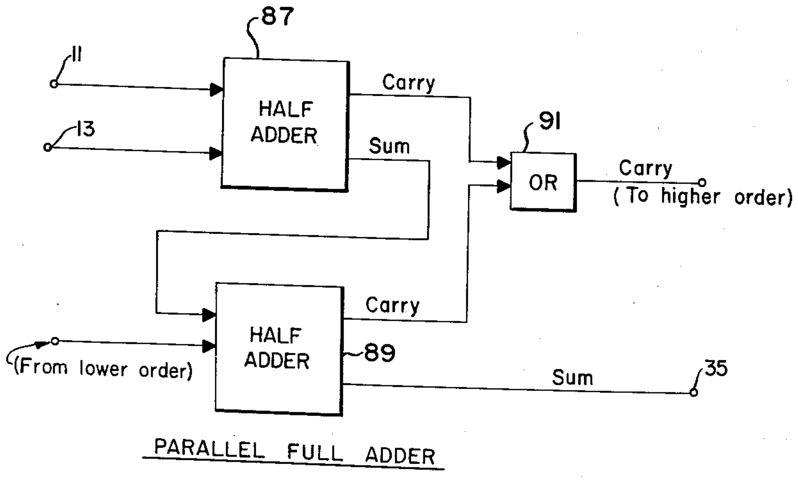
FIGURE 4 is a block diagram of a pair of half-adders employed in a full adder for use in a parallel machine.

A full adder may be provided by the combination shown in FIGURES 3 or 4. In the embodiment disclosed in FIGURE 3, which is useful in serial full adding, the elements are shown in block form. A first adder has the two inputs 11 and 13 and its "sum" output connected to an input terminal of a second half-adder. The "carry" output of the first half-adder is connected to an "or" gate. A second input to the "or" gate is from the "carry" terminal of the second half-adder. The output of the "or" gate is directed to a delay circuit and then to the other input of the second half-adder. The delay circuit 93 in series with the carry, which is necessary in the serial full adder of FIGURE 3, has a delay time equivalent to the time between pulses. Hence, the carry pulse from either of the half-adders is delayed one time period and added to the digit pulses initially applied to the inputs 11 and 13 of the half-adder 87 to arrive at a correct result.

The "or" circuit 91 and the delay circuit 93 are shown in block diagram and since they are well known in the art, a schematic is not believed necessary for an understanding of their operation.

The FIGURE 4 is a block diagram of a pair of half-adders as employed in a parallel machine. The half-adder 87 has a pair of inputs 11 and 13 and "carry" output directed to the "or" gate 91. A second half-adder 89 has a pair of inputs, the first input from a lower order and the second input from the "sum" output of the first half-adder 87. The "carry" output of the half-adder 89 is also connected to the "or" gate 91 and the "sum" output of the half-adder 89 is connected to the "sum" output terminal 35. The output of the "or" gate 91 is the "carry" terminal.

By the use of these circuits, the sum of two multidigit numbers may be formed by adding to the sum of the digits of like significance of the carry, if any, which may have resulted from the next lower place. This is equivalent to saying that, at any instant of time, we must add, in binary form, to the pulses shown in FIGURE 2, the carry pulse, if any, which comes from the resultant formed one time period earlier. The "carry" pulse may be due to the direct sum of two digits, if a one, or to the addition of the digits 1 and 0 and a carry 1 from the preceding interval.

As herein described, a simple and reliable semiconductor adder has been set forth which achieves a very high degree of reliability. A fast "carry" time is required in parallel logic systems for fast overall operation and the invention achieves this utilizing a minimum of components.

In a laboratory model of the half-adder which was constructed and operated in accordance with the invention, the diodes were T6G; the transistor was a 2N113; the resistor 37 was 243 ohms; the resistor 39 was 3,570 ohms; the resistor 41 was 5,490 ohms; and the resistor 55 had a value of 825 ohms.

In the embodiment disclosed herein, a PNP transistor is used as the current responsive means, but it is understood that it is possible to use an NPN transistor instead of a PNP by reversing the diodes and the voltage polarities and utilizing a negative voltage input instead of a positive voltage.

Although the invention has been described in connection with a certain specific embodiment it should be readily apparent to those skilled in the art that various changes and forms and arrangements of the parts can be made to suit requirements without departing from the scope and spirit of the invention. In this respect it should be apparent that it is possible by modification to vary the values of the components and the voltages necessary to operate the circuit.

I claim:

1. A half-adder comprising in combination, an "and" gate having a pair of diodes; and an "or" gate having a pair of diodes; a first input terminal connected to the cathode of the first diode of said "and" gate and to the anode of the second diode of said "or" gate; a second input terminal connected to the cathode of the second diode of said "and" gate and to the anode of the first diode of said "or" gate; a "carry" output terminal connected to the anodes of said "and" gate; a source of positive potential between said "carry" output terminal and the anodes of said "and" gate; a transistor having a base, collector and emitter; a connection from the cathodes of the diodes of said "or" gate to said emitter of said transistor; a source of positive potential in circuit with said base of said transistor and coupled to said anodes of said "and" gate; a "sum" terminal connected to said collector of said transistor; and a negative source of potential and a clamping diode connected between said collector and said "sum" terminal.

2. The combination as defined in claim 1 wherein said transistor is of the PNP type.

3. A half-adder comprising, in combination, an "and" gate and an "or" gate having mutual inputs and individual outputs connected respectively to "carry" and "sum" terminals; a current responsive means having main current carrying terminals in series between the output of said "or" gate and its "sum" terminal and having a control electrode; a source of potential; voltage divider means connecting said source to said output of said "and" gate; and a connection between said control electrode and an intermediate point on said voltage divider means.

References Cited in the file of this patent

UNITED STATES PATENTS

| | | |
|---|---|---|
| 2,815,913 | Lucas | Dec. 10, 1957 |
| 2,850,647 | Fleisher | Sept. 2, 1958 |
| 2,892,099 | Gray | June 23, 1959 |
| 2,895,673 | Williams | July 21, 1959 |
| 2,896,094 | Moody | July 21, 1959 |

OTHER REFERENCES

Arithmetic Operations in Digital Computers by Richards 1955, pp. 32, 84–87 and 130.

Richards: Text of Record; additional figs. 4–31(a), pp. 130–132.